May 22, 1934.　　　　　K. SHIOKAWA　　　　1,959,388
RADIO SIGNAL INDICATOR
Filed June 23, 1930　　　3 Sheets-Sheet 1
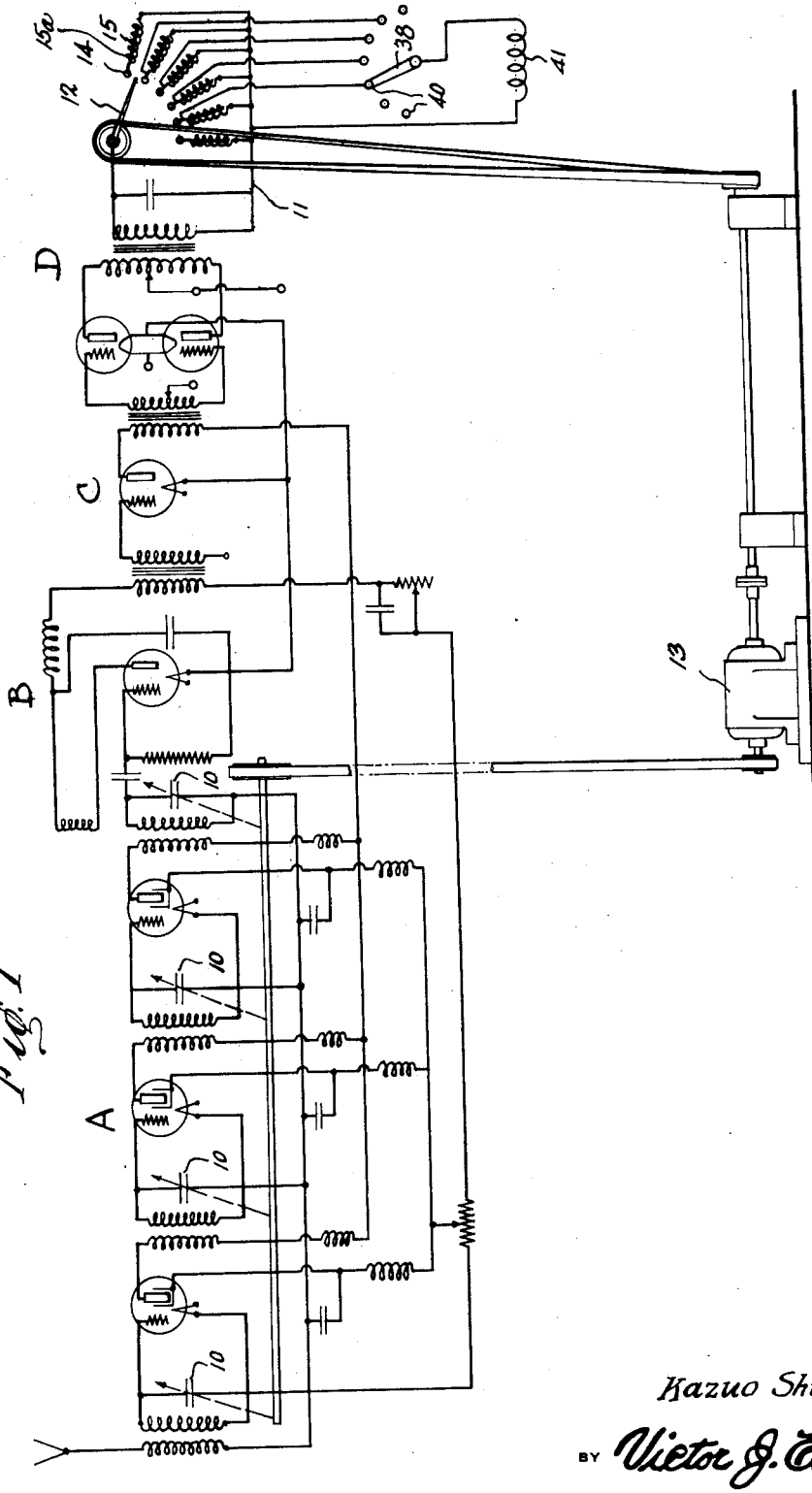
Kazuo Shiokawa
INVENTOR
BY Victor J. Evans
ATTORNEY

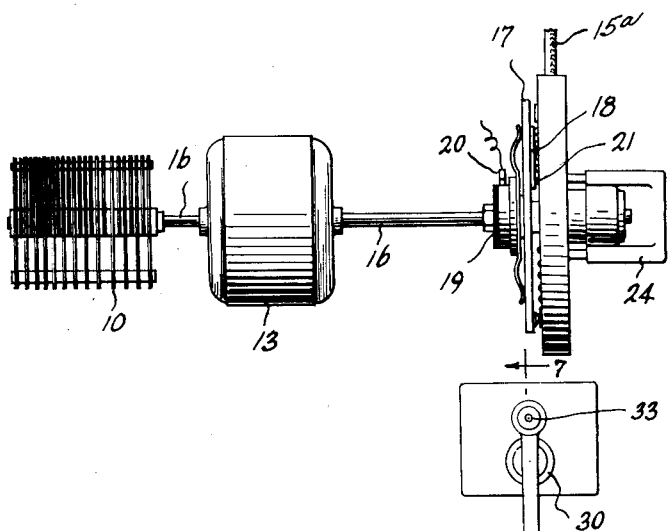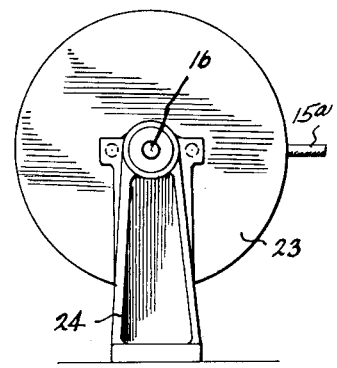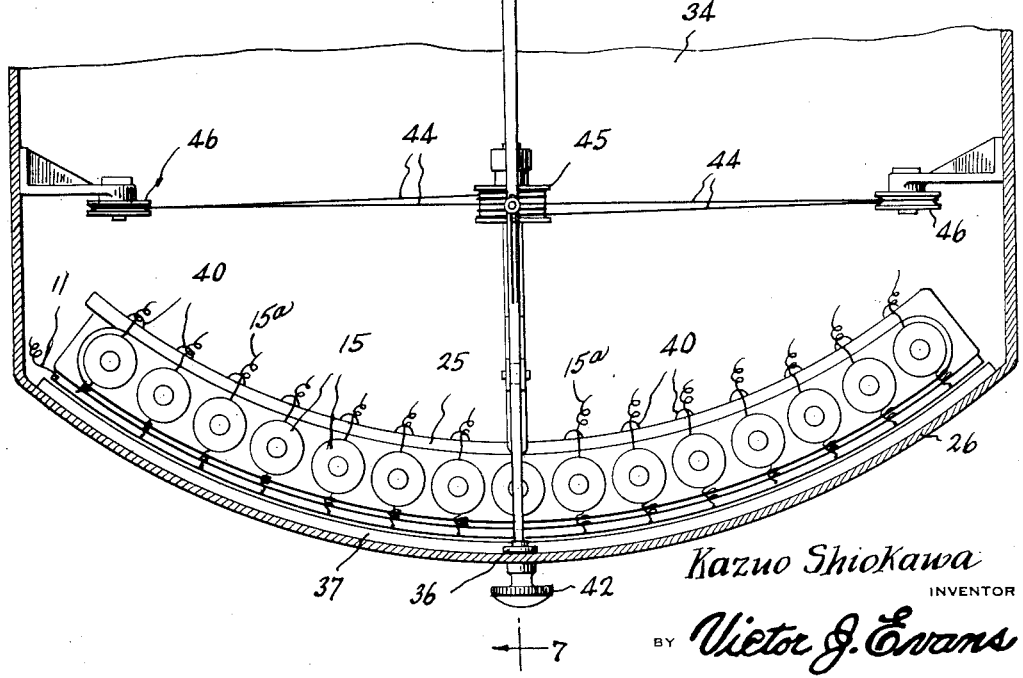

May 22, 1934.　　　　K. SHIOKAWA　　　　1,959,388
RADIO SIGNAL INDICATOR
Filed June 23, 1930　　　3 Sheets-Sheet 3

Kazuo Shiokawa
INVENTOR

BY Victor J. Evans
ATTORNEY

Patented May 22, 1934

1,959,388

UNITED STATES PATENT OFFICE 1,959,388

RADIO SIGNAL INDICATOR

Kazuo Shiokawa, New York, N. Y.

Application June 23, 1930, Serial No. 463,245

3 Claims. (Cl. 250—20)

This invention relates to radio receiving systems in general and particularly to a novel and improved method and apparatus for visually indicating received signals.

The primary object of the present invention is to provide a radio receiving equipment of any of the well known types with a novel arrangement whereby the operator is enabled to read the incoming signals visually.

Another object is to provide means for simultaneously and visually indicating the presence in the ether of a plurality of incoming signals so that the operator may know what stations are transmitting so that he may choose any desired station without difficulty and in a simple manner.

Other objects are to provide novel and improved apparatus for carrying out the foregoing objects and to generally simplify and improve signal reception.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 is a circuit diagram illustrating one form of the application of the present invention.

Fig. 2 is a top plan view of the synchronous tuning motor and its connections to the tuning condensers and signal contact disc.

Fig. 3 is an elevation of the right side of the contact disc and associated brush device shown in Fig. 2.

Fig. 4 is a top plan view of the indicator mechanism, a portion of the casing having been removed in order to show the arrangement.

Figure 5:
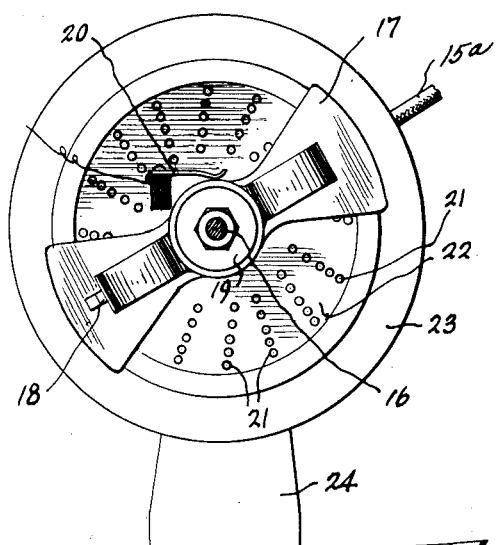
Fig. 5 is an elevation of the left side of the contact disc shown in Fig. 2.
Figure 6:
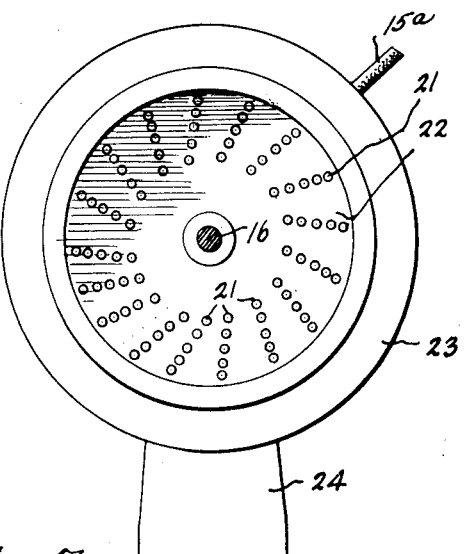
Fig. 6 is a view similar to Fig. 5 but having the contact brushes and holders removed to better illustrate the arrangement of the contacts.

Fig. 1 illustrates a well known type of radio receiving system having several stages of radio frequency amplification A, a detector and amplifier stage B of the regenerative type, and audio-frequency amplifier stage C and power amplifier stage of push-pull type. As customary in this type of receiver, the tuning condensers 10 of the first four stages are carried by a common shaft (see Fig. 2 also) which is driven by a motor for a purpose to be described later herein.

The output from the last stage audio-frequency amplifier D is connected to a common wire 11 and to a rotary contact 12 driven by the motor 13 which also drives the shaft carrying the tuning condensers 10 so that the contact 12 rotates in synchronism with the tuning condensers 10. The contact 12 is adapted to sweep over and make contact with a plurality of stationary contacts 14 each contact 14 being connected to one end of the winding of indicator magnets 15 the other end of the winding of each magnet being connected to the common wire 11.

Fig. 1 is intended to be purely diagrammatic and is used to illustrate the broad principle on which the present invention operates. It will be readily perceived that the rotation of the tuning condensers will from instant to instant tune the apparatus to a different incoming signal which will be amplified, detected, and again amplified. Since the pulsating current delivered by the output side of the amplifier D is deliverable to any one at a time of the magnets 15 they will attract their armatures at the instant the contact 12 touches the corresponding contact 14, provided there is an incoming signal of the wave length to which the receiving apparatus is momentarily tuned by the synchronously rotating condensers 10.

Each of the magnets 15 corresponds to a particular signal wave length and the contacts are so related to the condensers 10 that the magnet corresponding to a particular wave length will be energized by the contact 12 at the instant the condensers 10 are tuning the receiving apparatus to that wave length, provided, of course, that a signal is being transmitted at that wave length at the instant contact is made.

The speed of the motor 13 is of such magnitude that the contact 12 travels over the contacts 14 so rapidly as to energize almost simultaneously all of the magnets 15 corresponding to all incoming signals within the receiving range of the apparatus. It will be clear, therefore, that vibration of plunger 27 by energization of some of the magnets 15 will be produced and may be made to give a visual indication of the incoming signals in a manner now to be described.

The condensers 10 are mounted upon a shaft 16 which may be an extension of the shaft of motor 13. The shaft 16 also carries a revolving brush holder 17 having a brush 18 insulated from the holder 17 and connected by means of a slip ring 19 and brush 20 with one of the output terminals of the output transformer. The brush 18 corresponds to the brush 12 in Fig. 1.

The brush 18 is pressed into contact with contacts 21 carried by an insulating disc 22 mounted in a support 23 carried by a post or frame 24. The contacts 21 correspond to the contacts 14 and are connected to the magnets 15 of the indicator shown in Figs. 4 and 7.

The magnets 15 are carried by a curved frame 25 mounted in a casing 26, a space below each magnet containing a plunger 27 acting as an armature. The individual recess 28 containing each magnet 15 is provided with apertures 29 adapted, when the plungers 27 are raised, to permit light from an incandescent lamp 30 to pass through and illuminate the scale 31 which may be graduated in wave lengths or frequencies as desired.

It will be clear that energization of the magnets 15 in the manner previously described will cause the armatures or plungers 27 all corresponding to the wave lengths of incoming signals or to the frequency assigned to each magnet 15 to be drawn up permitting light to pass through and cast images of the openings 29 on the screen 31 thereby indicating visually the fact that signals of certain wave lengths are present in the ether. If any of such signals happen to be code signals they may be read by the durations of the periods of light brought about by the vibration of the armatures 27 correspondingly.

The connections to the magnets 15 are made through a cable 15a containing the wires leading from contacts 21 to magnets 15. It will be observed that the contacts 21 are so arranged that only one at a time is covered by the brush 18, the approximately radial arrangement being used for the purpose of increasing the contact capacity of the contact disc without making the disc too large and cumbersome.

Figure 7:
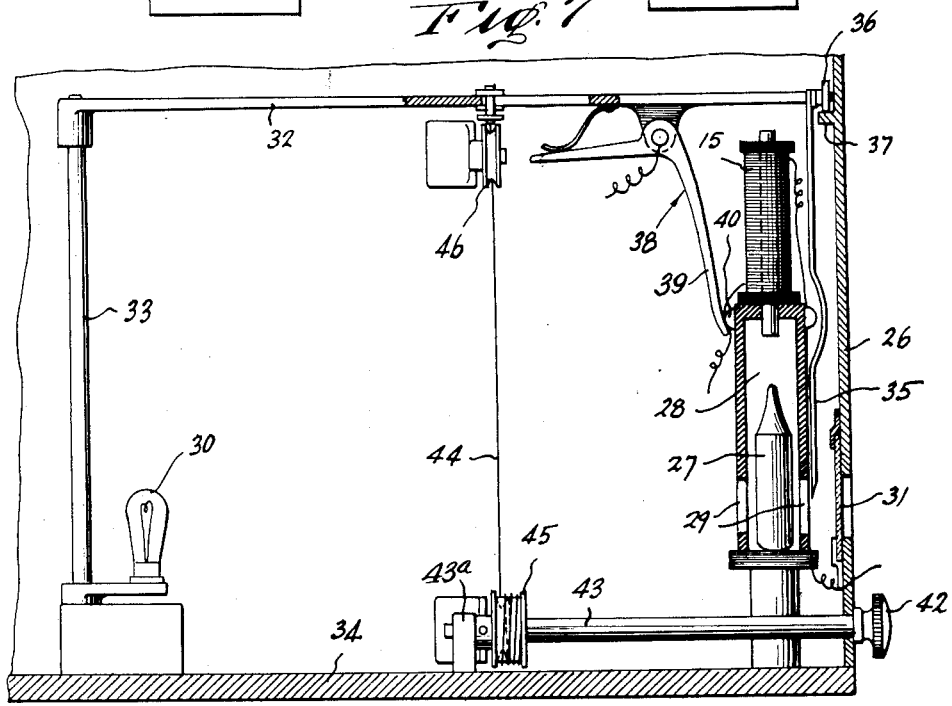
Fig. 7 is a vertical section taken on the line 7—7 of Fig. 4.
Figure 8:
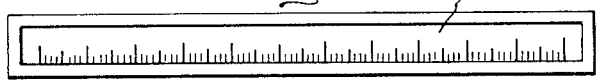
Fig. 8 is a view of the scale graduations on the indicator glass.

In order to permit use of the usual sound reproducer to listen to any desired station there is provided a selector which is adapted to put any of the magnets 15 in parallel with the coil of the sound reproducer. Figs. 1, 4 and 7 illustrate the arrangement which comprises an arm 32 adapted to swing horizontally about a vertical pivot 33 extending vertically from the base 34 of the casing 26 containing the magnets 15. The arm 32 has a pointer 35 extending downwardly in the rear of the scale 31 so as to be clearly visible therethrough. The free end of the arm 32 has an anti-friction roller 36 riding on a circular track 37 which serves to support and guide the arm.

Mounted upon the arm 32 is an insulated contact member 38 having an arm 39 arranged to make contact with buttons 40 insulated from the frames supporting the magnets 15 and connected to the ends of the magnet coils which are connected to contacts 14. The member 38 is connected to one end of the winding 41 of the sound reproducer, the other end of the winding 41 being connected to the ground wire 11. It will be clear that the coil of any desired magnet 15 may be connected in parallel with the sound reproducer.

The arm 32 may be set manually to select any one of the contacts 40 by means of a knob 42 mounted upon a shaft 43 which is journaled in a bearing 43a carried by the base 34. An endless cable 44 wound upon a drum 45 fast upon shaft 43 passes over guide pulleys 46 and the ends thereof are fastened to the mid point of arm 32. It will be clearly perceived that by turning the knob 42 in either direction the contact member 38 may be brought to contact with any of the buttons 40 thereby selecting the desired magnet 15 for connection in parallel with the coil 41, thus the station corresponding to the selected magnet 15 can be heard to the exclusion of all other stations.

The visual indicating mechanism and station selector herein described may be used for a variety of purposes such as in connection with a radio compass or direction finder or to read code signals visually owing to the varying intensity of light through the openings 29, produced by varying rapidity of vibration of the plungers 27.

An important feature of this invention is its applicability to wired radio, wherein transmitting and receiving stations are connected by means of wires; in which case the plurality of transmitted signals is efficiently received by the receiver incorporating the invention described herein.

At times it might be desired to invert the system and use it to transmit a plurality of signals practically simultaneously. This is accomplished by including a microphone in circuit with each of the magnets 15 and delivering the output of the microphone to a system of modulators and oscillators, the microphonic circuits being connected separately and in succession to the transmitter circuit.

The hereinbefore described construction admits of considerable modification without departing from the invention; therefore, I do not wish to be limited to the precise arrangements shown and desribed, which are as aforesaid, by way of illustration merely. In other words, the scope of protection contemplated is to be taken solely from the appended claims, interpreted as broadly as is consistent with the prior art.

What I claim is:

1. In a radio receiving system the combination of rotary tuning devices, a light source, a screen, a series of signal devices comprising electromagnets and plungers for said magnets adapted to permit light from said light source to strike said screen when said magnets are energized, a series of contacts connected to said magnets, a rotary contact adapted to successively contact with said contacts individually, said rotary contact and a common conenction from said magnets being connected to the output of said system, and a motor for driving said contact and said tuning devices in synchronism.

2. In a radio receiving system, the combination of rotary tuning devices, a light source, a screen, a series of signalling devices comprising electromagnets having plunger guides with openings therethrough to permit light from said source to strike the screen, plungers in said guides and closing said openings except when the magnets are energized, a series of contacts connected to said magnets, a rotary contact adapted to successively engage said contacts individually, said rotary contact and a common connection from said magnets being connected to the output of the system, and means for driving said rotary contact and tuning devices in synchronism.

3. In a radio receiving system, the combination of rotary tuning devices, a light source, a screen, a series of signalling devices comprising electromagnets and plungers for said magnets adapted to permit light from said source to strike said screen when the magnets are energized, a series of contacts connected one each to each of said magnets, a rotary contact traversing the series of contacts to engage each in sucession, said rotary contact and a common connection from said magnets being connected to the output of said system, means for synchronously operating the tuning devices and said rotary contact, a second series of contacts electrically connected one each with each of the first series of contacts, an audible indicator having one terminal connected to the common terminal of said magnets, and a manually adjustable contact member selectively engageable with any one of the second series of contacts and electrically connected with the audible indicator.

KAZUO SHIOKAWA.